(12) United States Patent
Tseng et al.

(10) Patent No.: US 9,019,513 B2
(45) Date of Patent: Apr. 28, 2015

(54) MULTI-DIMENSIONAL DATA REGISTRATION INTEGRATED CIRCUIT FOR DRIVING ARRAY-ARRANGEMENT DEVICES

(71) Applicant: National Tsing Hua University, Hsinchu (TW)

(72) Inventors: Fan-Gang Tseng, Hsinchu (TW); Jian Chiun Liou, Kaohsiung County (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/096,899

(22) Filed: Dec. 4, 2013

(65) Prior Publication Data

US 2014/0091836 A1 Apr. 3, 2014

Related U.S. Application Data

(63) Continuation-in-part of application No. 12/480,332, filed on Jun. 8, 2009, now Pat. No. 8,625,153.

(30) Foreign Application Priority Data

Jun. 20, 2008 (TW) .............................. 97123013 A

(51) Int. Cl.
*G06F 15/00* (2006.01)
*G06K 15/10* (2006.01)
*B41J 2/045* (2006.01)

(52) U.S. Cl.
CPC ............. *G06K 15/10* (2013.01); *B41J 2/04541* (2013.01); *B41J 2/04586* (2013.01)

(58) Field of Classification Search
CPC .................................. G06K 15/10; B41J 29/38
USPC .......... 326/63, 80, 82; 327/108–109; 358/1.1, 358/1.8; 347/58, 61; 385/16–17
See application file for complete search history.

(56) References Cited

U.S. PATENT DOCUMENTS

| | | | | |
|---|---|---|---|---|
| 5,635,968 A | * | 6/1997 | Bhaskar et al. | 347/59 |
| 7,441,851 B2 | * | 10/2008 | Liou et al. | 347/12 |
| 8,625,153 B2 | * | 1/2014 | Tseng et al. | 358/1.8 |

* cited by examiner

*Primary Examiner* — Jason M Crawford
(74) *Attorney, Agent, or Firm* — WPAT, P.C.; Anthony King

(57) ABSTRACT

The multi-dimensional data registration integrated circuit for driving array-arrangement devices, comprising: a plurality of the i-th hierarchy sets, each of the i-th hierarchy sets is divided into a plurality of the (i+1)-th hierarchy sets; a i-th hierarchy address selection circuit, comprising a signal generation unit and a multiplexing unit, wherein the former generates an enable signal, the latter is connected to the signal generating unit and shifts the input data based on the enable signal and a second timing signal to further generate n bits of address signals, the i-th hierarchy address selection circuit is used to scan the plurality of the i-th hierarchy sets and select at least one of the i-th hierarchy sets to function; and a data supply circuit to follow a scan sequence of a j-th hierarchy address selection circuit and write a plurality of data into the selected j-th hierarchy sets.

15 Claims, 21 Drawing Sheets

MULTI-DIMENSIONAL DATA REGISTRATION INTEGRATED CIRCUIT FOR DRIVING ARRAY-ARRANGEMENT DEVICES

CROSS-REFERENCE TO RELATED APPLICATION

This application is a continuation-in-part of prior U.S. patent application Ser. No. 12/480,332, filed on Jun. 8, 2009. The patent application identified above is incorporated here by reference in its entirety to provide continuity of disclosure.

BACKGROUND OF THE INVENTION

1. Field of the Invention

The present invention relates to a multi-dimensional data registration integrated circuit for driving array-arrangement devices, and more particularly, to a multi-dimensional integration and multi-task chip for driving a large microelectronic array system.

2. Description of the Related Art

FIG. 1 is a schematic diagram of a traditional two-dimensional address selection circuit for driving 25 nozzles of a printhead. A two-dimensional address selection circuit 10 comprises a plurality of address selection lines A1-A5 and a plurality of data lines D1-D5. A plurality of array-arrangement control units 11 are at the intersections of the plurality of address selection lines A1-A5 and the plurality of data lines D1-D5. Each of the control units 11 comprises a transistor 111 and a resistor 112 for controlling a corresponding nozzle (not shown) to shoot a micro-scale ink droplet. When a transistor 111 is turned on by its connected address selection line, the data line connected to the transistor 111 supplies the resistor 112 connected to the transistor 111 with a pulse voltage. A bubble is generated through the pulse voltage, and a microdroplet is forced out of a corresponding nozzle by the bubble. G1-G5 in this figure represent ground terminals.

The printing technology of inkjet printers is continuously improving, because the requirements for high printing quality and resolution continue to increase. As ink droplet sizes are reduced, higher printing resolution of inkjet printers becomes feasible. However, the printing speed is reduced if only the resolution is improved. Most current inkjet printheads utilize the two-dimensional address selection circuit in FIG. 1 to directly drive their nozzle arrays to shoot micro ink droplets. When higher printing speed and greater resolution is needed, the driving time should be reduced and more nozzles have to be simultaneously controlled. Unfortunately, the aforesaid two-dimensional driving circuit or one-dimensional driving circuit limits the printing speed and allowable printhead number. For simultaneously improving both printing speed and resolution, more nozzles have to be provided on a single printhead chip. However, it appears that the two-dimensional driving circuit or one-dimensional driving circuit cannot satisfy such requirements.

The aforesaid technology can also be applied to drive array-arrangement thermal-optical switches, and the thermal-optical switches can control resistors to generate heat through direct current in current development. When the current passes the resistor-type heater ring, the metal film of the ring becomes hot, and the heat distribution of the branches of the waveguide changes. Accordingly, the refraction indexes of the waveguide under the heater ring change. Therefore, the optical couple can be direct from the main of the waveguide to the destination branch of the waveguide, hence the optical switches can be specified to open or close. However, such a system of thermal-optical switches cannot satisfy the requirements for large amounts of data to be transmitted, stored, exchanged and processed at high speed. Because the number of the thermal-optical switches is great, driving the resistors through direct current causes low reliability, low switch speed and temperature instability of the resistors.

Furthermore, many additional external pads are needed when the number of the thermal-optical switches arranged in an array is increased. Consequentially, the cost and failure rate of the package are increased. For example, an array comprising 300 thermal-optical switches needs 302 external pads. It is necessary for each of these external pads to have a good electrical connection with an external driving circuit board. However, if any of the external pads does not have a good electrical connection, the corresponding thermal-optical switches will fail to normally operate so that the designated paths of the waveguide cannot be heated. That is, the optical coupling effects cannot be passed from the main of the waveguide to the branch of the waveguide. If the number of external pads can be reduced and the same number of the thermal-optical switches still can be controlled, the aforesaid problems can be resolved.

SUMMARY OF THE INVENTION

The present invention provides a multi-dimensional data registration integrated circuit for driving array-arrangement devices. It utilizes multi-dimensional or multi-hieratical circuit configuration to reduce the number of external terminals. Data is separately and sequentially output in a multiplex manner so that a large number of microelectronic devices arranged in an array can be controlled. Such an array is applicable to array-arrangement thermal-optical switches or a nozzle array device on an inkjet chip.

The present invention provides a multi-dimensional data registration integrated circuit capable of selecting processing signals. The data processing is performed in a manner whereby data is selected according to priority. The efficiency of the data registration of such a microelectronic device array is thereby improved.

The present invention provides a multi-dimensional data registration integrated circuit for driving array-arrangement devices. The array-arrangement devices comprise a plurality of the i-th hierarchy sets, each of the i-th hierarchy sets is further divided into a plurality of the (i+1)-th hierarchy sets, wherein both i and n are positive integers and 0<i<n; a i-th hierarchy address selection circuit, comprising a signal generating unit and a multiplexing unit, wherein the signal generating unit generates an enabling signal based on a first timing signal and an input data, the multiplexing unit is electrically connected to the signal generating unit via a shift register and shifts the input data based on the enabling signal and a second timing signal to further generate n bits of address signals, the shift register generate a set of enabling signals via a first control circuit, a second control circuit, or a third control circuit, a logic operation is performed between the address signal and one of the set of enabling signals to drive a cell circuit, the i-th hierarchy address selection circuit is used to scan the plurality of the i-th hierarchy sets and select at least one of the i-th hierarchy sets to function; and a data supply circuit to follow a scan sequence of the j-th hierarchy address selection circuit and write a plurality of data into the selected j-th hierarchy sets, and 1<j<(n+1).

Preferably, the i-th hierarchy address selection circuit further comprises a level shift register circuit, the level shift register circuit is used to output a plurality of the i-th hierarchy address selection signals, and the plurality of the i-th hierarchy address selection signals are used to select the plurality of the i-th hierarchy sets.

Preferably, the array-arrangement devices comprise a plurality of thermal resistors, and the plurality of thermal resistors are used to control a plurality of nozzles of a printhead chip.

Preferably, the i-th hierarchy address selection circuit comprises asymmetric MOSFET devices or CMOSFET devices.

Preferably, the shift register comprises n D flip-flops in series and generates the set of enabling signal via a first control circuit, a second control circuit, or a third control circuit.

Preferably, the first control circuit is to connect an output of a k-th D flip-flop from the output end to a trigger end of a (k+1)-th D flip-flop, such that the n D flip-flops output the set of enabling signal once for every two timing periods, and $0<k<n$.

Preferably, the first control circuit is to connect an output of a k-th D flip-flop from the output end to a trigger end of a (k+2)-th D flip-flop, such that the n D flip-flops output the set of enabling signal once for every three timing periods, and $1<k<n$.

Preferably, the first control circuit is to connect an output of a k-th D flip-flop from the output end to a trigger end of a (k+3)-th D flip-flop, such that the n D flip-flops output the set of enabling signal once for every four timing periods, and $2<k<n$.

Preferably, the shift register is electrically connected to the signal generating unit.

Preferably, the i-th address selection circuit further comprises a latch control unit, and the latch control unit generates and maintains a plurality of output signal based on a third timing signal.

Preferably, the logic operation further comprises the step of using each one of a set of AND logic gates to perform an AND operation.

Preferably, the number of the AND gates is equal to the multiplication of the number of the address signals and the number of the enabling signals.

Preferably, the shift register comprises p shifting sub-circuit, each of the shifting sub-circuit comprises a type-I D flip-flop and a type-II D flip-flop, and p is a positive integer.

Preferably, a trigger end of the t e-I D flip-flop receives the second timing signal, the input end of the type-II D flip-flop is electrically connected to the output of the type-I D flip-flop, the trigger end of the type-II D flip-flop receives the enabling signal, and the type-II D flip-flop outputs the address signal based on the output of the type-I D flip-flop and the enabling signal.

Preferably, the input end of the type-I D flip-flop of the first shifting sub-circuit of the p shifting sub-circuits receives the input data, the input of the type-I D flip-flop of each of the other (p−1) shifting sub-circuit is electrically connected to the input end of the type-I D flip-flop of the next shifting sub-circuit.

BRIEF DESCRIPTION OF THE DRAWINGS

The objectives and advantages of the present invention will become apparent upon reading the following description and upon reference to the accompanying drawings in which.

DETAILED DESCRIPTION OF THE PREFERRED EMBODIMENTS

The following will demonstrate the present invention using the accompanying drawings to clearly present the characteristics of the technology.

Figure 1:
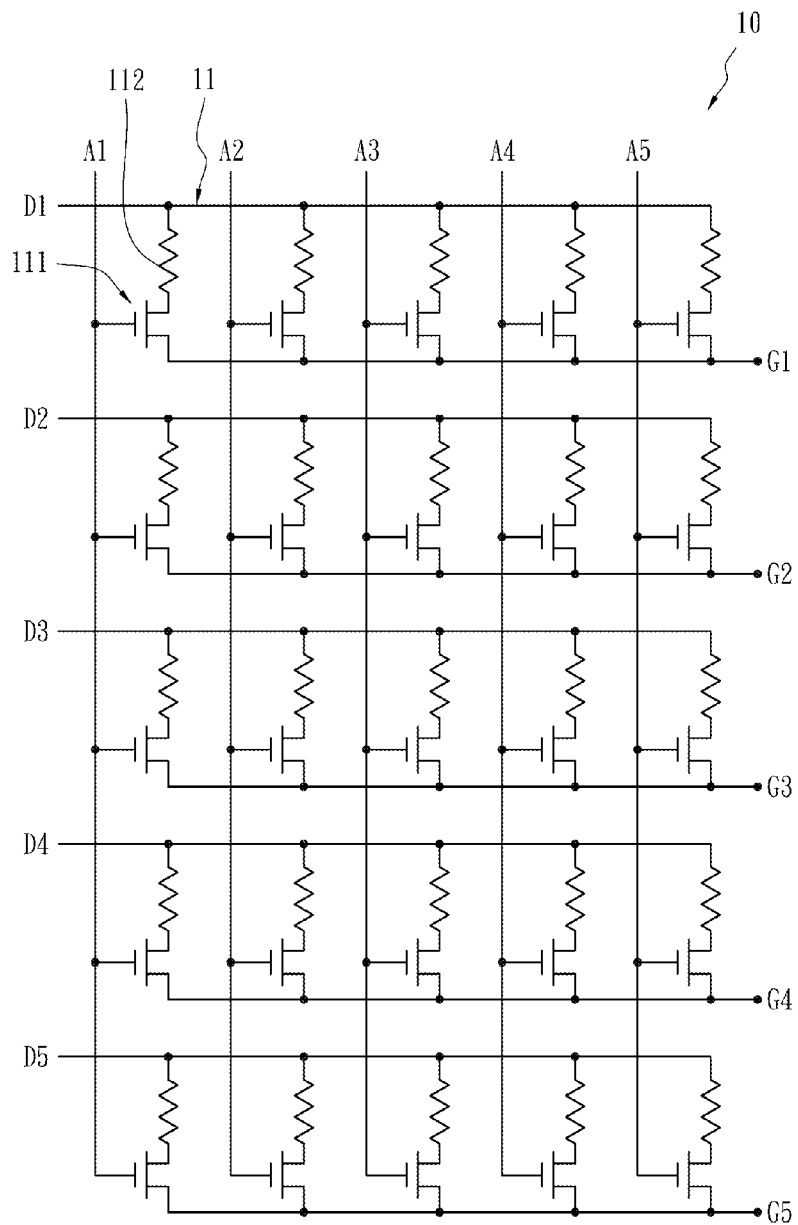
FIG. 1 is a schematic diagram of a traditional two-dimensional address selection circuit for driving 25 nozzles of a printhead.
Figure 2A:
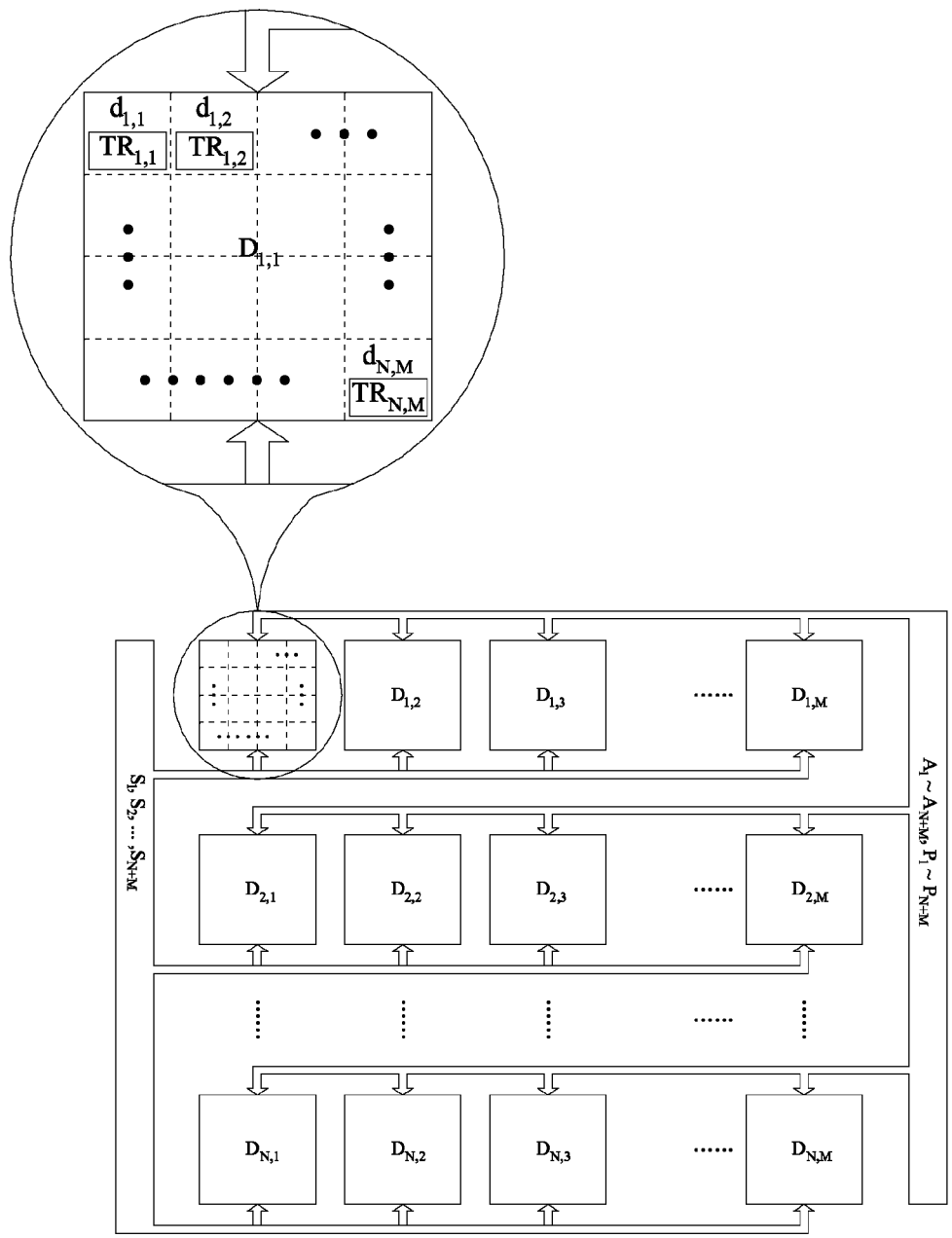
FIG. 2A is a schematic diagram of a multi-dimensional data registration integrated circuit for driving array-arrangement devices in accordance with the present invention.

FIG. 2A is a schematic diagram of a multi-dimensional data registration integrated circuit for driving array-arrangement devices in accordance with the present invention. In this figure, D1,1, D1,2, ..., DN,M represent a plurality of first hierarchy sets in which a plurality of array-arrangement devices are divided. Each of the first hierarchy sets comprises partial array-arrangement devices to be driven. Referring to numeral references 111 and 112 in FIG. 1, each device can be an assembly of switches such as a transistor and a resistor. The array-arrangement devices may comprise a plurality of thermal resistors TR1,1, TR1,2, ..., TRN,M, and the plurality of thermal resistors TR1,1, TR 1,2, ..., TRN,M are used to control a plurality of nozzles of a printhead chip. In addition to the previous assembly, an alternative assembly comprises a resistor and a thermal-optical switch. Sl, S1,2, ..., SN,M represent first hierarchy address selection signals, which can scan and select the plurality of first hierarchy sets D1,1, D1,2, ..., DN,M to be activated. Al, A2, ..., AN+M represent second hierarchy address selection signals, which can scan and select the second hierarchy sets d1,1, d1,2, ..., dN,M of the activated first hierarchy set. Each of the second hierarchy sets comprises fewer partial array-arrangement devices, which can also be the devices located in one row or one column.

When one of the second hierarchy sets is selected by the second hierarchy address selection signal to be activated, data signals Pl, P2, ..., PN+M are written into the corresponding devices of the activated second hierarchy set.

Similarly, the second hierarchy set can be further divided into a plurality of third hierarchy sets. Each of the third hierarchy sets comprises partial array-arrangement devices, which can also be the devices located in one row or one column. In this embodiment, a set of third hierarchy address selection signals is needed. One of the third hierarchy sets is selected by the third hierarchy address selection signal to be activated, and data signals P1, P2, ..., PN+M are written into the corresponding devices of the activated third hierarchy set. Similarly, the third hierarchy set can be further divided into a plurality of fourth hierarchy sets, and fourth hierarchy set can be further divided into a plurality of fifth hierarchy sets, and finally a plurality of k-th hierarchy sets are divided.

Figure 2B:
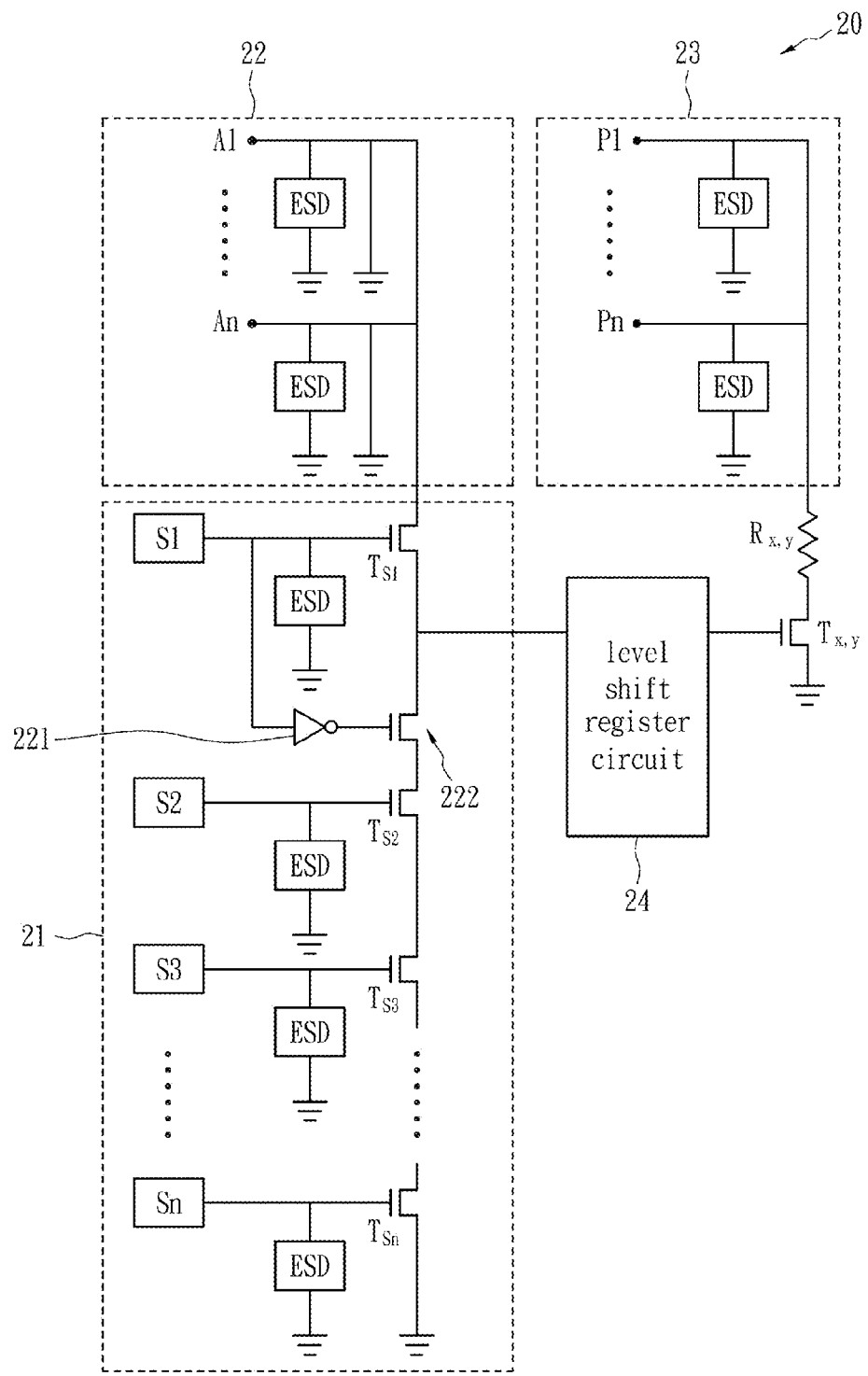
FIG. 2B is a configuration diagram of a multi-dimensional data registration integrated circuit in accordance with the present invention.

FIG. 2B is a configuration diagram of a multi-dimensional data registration integrated circuit in accordance with the present invention. A multi-dimensional data registration integrated circuit 20 comprises a first hierarchy address selection circuit 21, a second hierarchy address selection circuit 22, a data supply circuit 23, and a level shift register circuit 24. The first hierarchy address selection circuit 22 generates the first hierarchy address selection signals S1, S2, ..., SN,M, the second hierarchy address selection circuit 22 generates the second hierarchy address selection signals A1, A2, ..., AN+M, and the data supply circuit 23 generates the data signals P1, P2, ..., PN+M.

If a resistor Rx,y is designated to generate heat, the corresponding first hierarchy address selection signal, second hierarchy address selection signal and data signal are simultaneously at a high level or an active level. For example, when the designated resistor Rx,y is R1,1, the signals S1, A1, and P1 are at the active level. The signal S1 turns on the transistor Ts1, and simultaneously a transistor 222 is turned off by an inverter 221. When the transistor 222 is inactive, the second hierarchy address selection signal cannot pass transistors Ts2, Ts3, ..., Tsn even if they are turned on by the first hierarchy address selection signal. Instead, the second hierarchy address selection signals A1, A2, ..., AN+M are input into the level shift register circuit 24 through the transistor Ts1, and the level shift register circuit 24 sequentially outputs and scans the second hierarchy sets d1,1, d1,2, ..., dN,M of the first hierarchy set D1,1 arranged in an array. Because the signals S1, A1, and P1 are simultaneously at an active level and the transistor Ts1 is opened, the resistor R1,1, through which the circuit of the signal P1 passes, generates heat.

The present invention proposes an aspect of multi-dimensional data registration to reduce the number of external terminals. Data are separately and sequentially output in a multiplex manner, and a large number of microelectronic devices arranged in an array are controlled. Furthermore, asymmetric MOS (Metal Oxidation Semiconductor) devices and CMOS (Complementary Metal Oxidation Semiconductor) devices are employed, and the corresponding process technology is also introduced in fabricating such a novel circuit. The present invention utilizes asymmetric MOSFET (Metal Oxidation Semiconductor Field Emitting Transistor) devices or CMOSFET devices, and integrates such devices to form a logic sequential multi-task control circuit for address selection applied to a thermal-optical switch array device or the nozzle array of a printhead chip.

The present invention provides a multi-dimensional data registration integrated circuit for driving array-arrangement devices. The invention utilizes multi-dimensional decoding to reduce the required number of external terminals. For example, N is designated as the number of external terminals, and Y is the number of nozzles; if the multi-dimensional data registration is employed, the number of external terminals is expressed as $N=3\times\sqrt[3]{Y}+1$. As to the conventional two-dimensional data registration circuit, the number of external terminals is expressed as $N=3\times\sqrt{Y}+1$. The present invention can not only reduce the number of external terminals but also simplify the corresponding driving circuit. Therefore, the manufacturing cost is reduced. The following table shows the relation between the number of external terminals and the number of nozzles. If a conventional 600dpi inkjet printhead has 1024 nozzles, at least 65 external terminals are needed using the prior art. By contrast, using the method according to the present invention, only 31 external terminals are needed. Compared to the prior art, the present invention can control a greater number of nozzles with the same number of external terminals so as to have the advantages of high resolution and fast printing speed.

TABLE 1

| | Circuit configuration | | |
|---|---|---|---|
| | One D | Two D | Three D |
| Number of nozzles Y | 1000 | 1024 | 1000 |
| Number of thermal resistors | 1000 | 1024 | 1000 |
| Resolution (dpi) | 300 | 300-600 | Above 600 |
| Number of external terminals N | $N = Y + 1$<br>1001 | $N = 2 \times \sqrt[2]{Y} + 1$<br>65 | $N = 3 \times \sqrt[3]{Y} + 1$<br>31 |

In view of the above table, when the number of the nozzles is greater than 27, the three dimensional circuit configuration is superior to the conventional two dimensional circuit configuration. Furthermore, the number of first hierarchy address selection signals should be larger than four when the number of nozzles of a printhead chip is greater than four.

Figure 3:
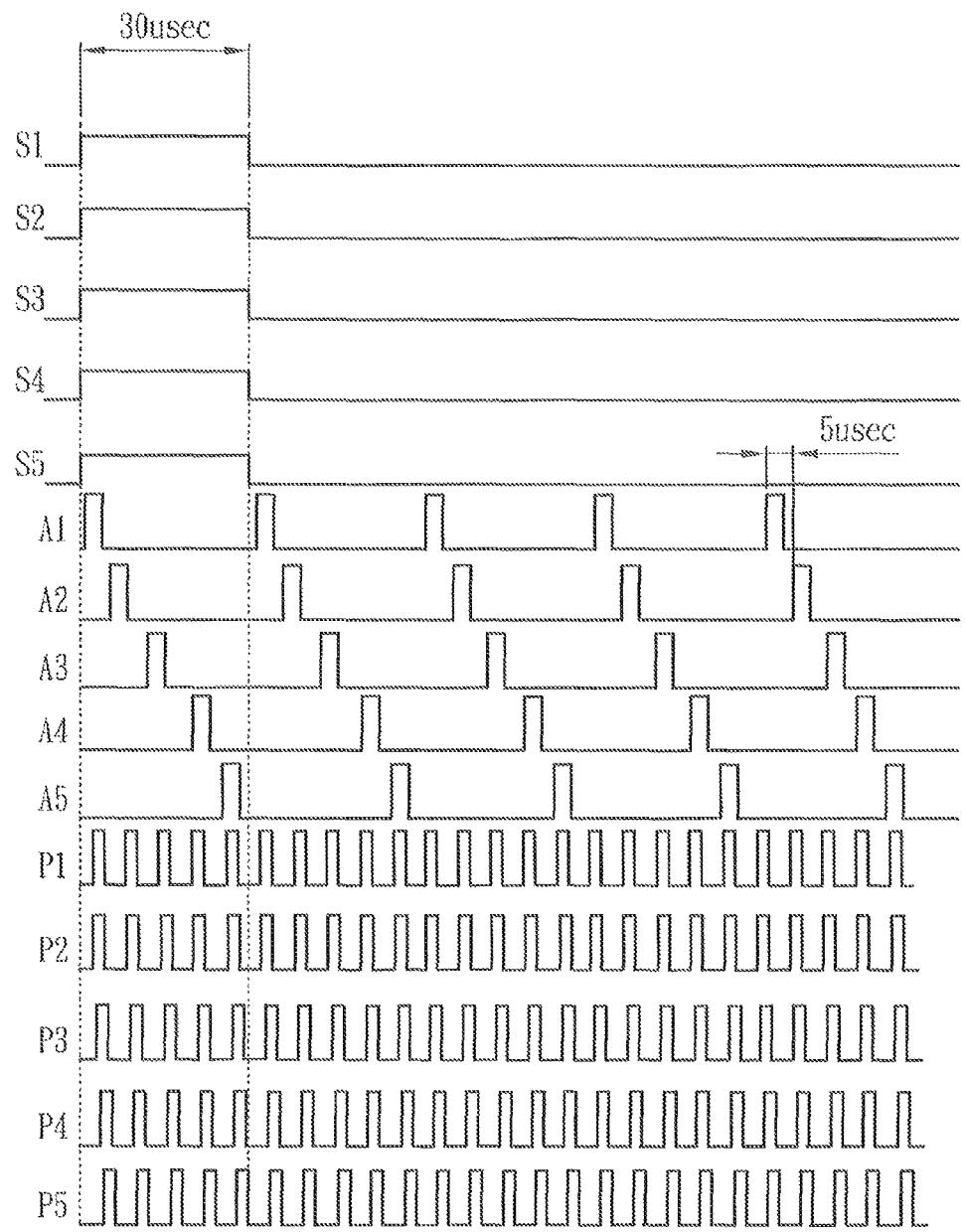
FIG. 3 is a waveform diagram of signals generated by a multi-dimensional data registration integrated circuit in accordance with the present invention.

FIG. 3 is a waveform diagram of signals generated by a multi-dimensional data registration integrated circuit in accordance with the present invention. When the first hierarchy address selection signals S1, S2, . . . , S5 are simultaneously at a high level or an active level and the transistors Ts2, Ts3, . . . , Ts5 are activated by the signals S2, . . . , S5, the inverter 221 and transistor 222 prevent the second hierarchy address selection signals from passing through these transistors. The pulses of the second hierarchy address selection signals A1, A2, . . . , AS sequentially occur when the first hierarchy address selection signal S1 activates the transistor Ts1. The pulses of the data signals P1, P2, . . . , P5 occur simultaneously with the pulses of the second hierarchy address selection signals A1, A2, . . . , A5.

Figure 4A:
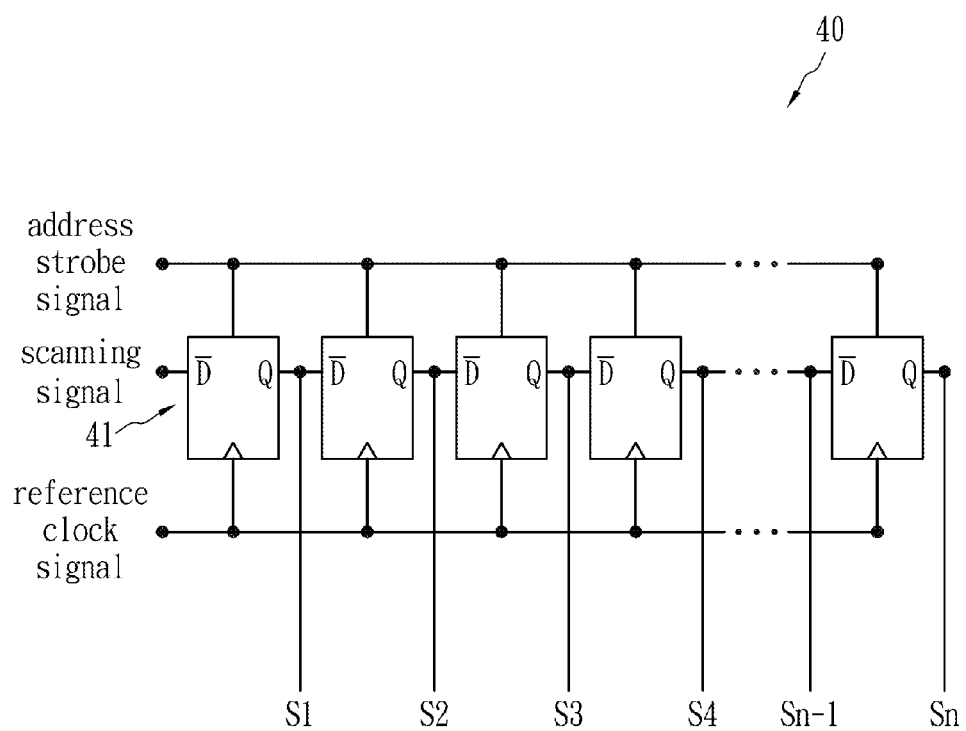
FIG. 4A is a configuration diagram of a level shift register in accordance with the present invention.

FIG. 4A is a configuration diagram of a level shift register in accordance with the present invention. A level shift register circuit 40 comprises a plurality of registers 41 connected in series. Through the triggers of the address strobe signals and the cycles of a reference clock signal, the level shift register circuit 40 acts as a serial-in parallel-out circuit.

Figure 4B:
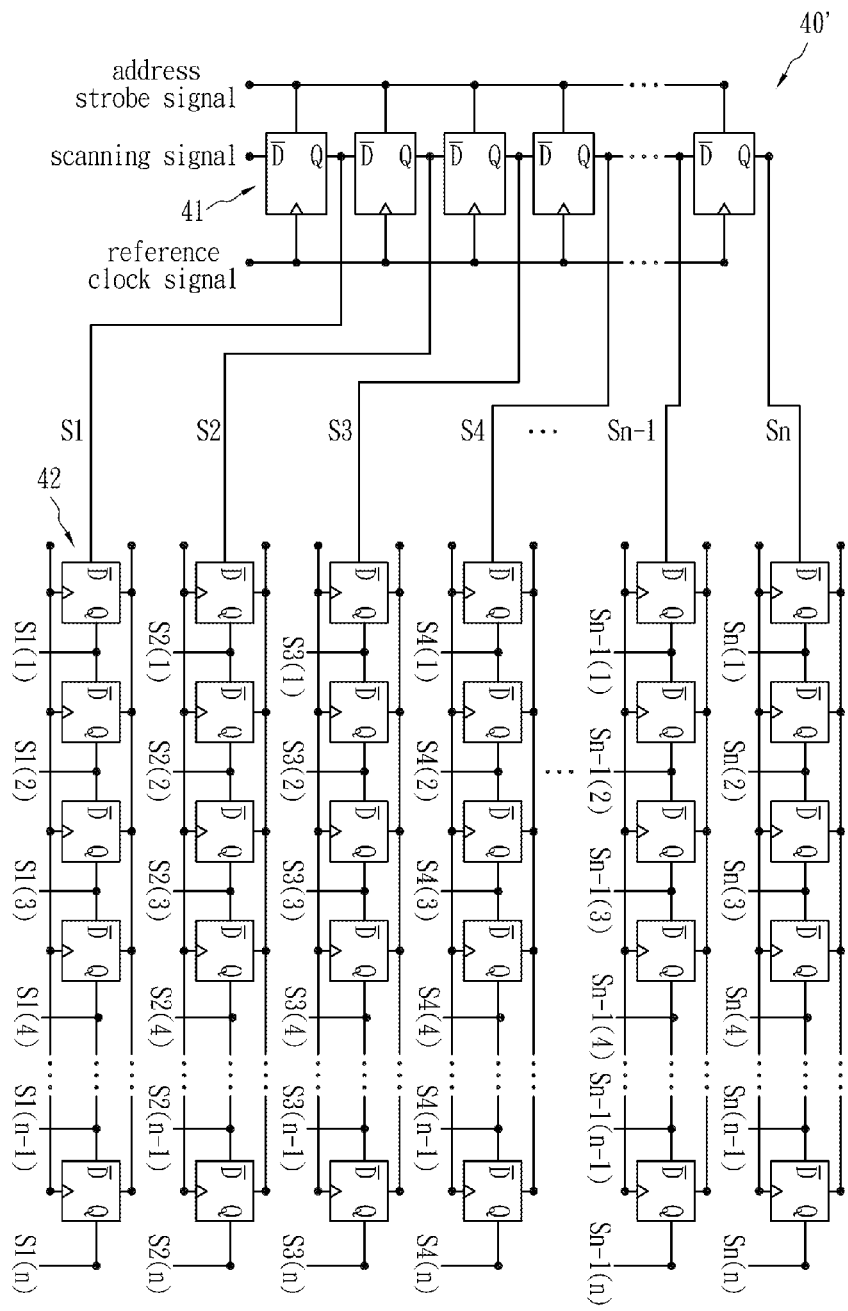
FIG. 4B is a configuration diagram of a level shift register in accordance with another embodiment of the present invention.

Each of the second hierarchy sets d1,1, d1,2, . . . , dN,M is further divided into a plurality of third hierarchy sets. Accordingly, third hierarchy address selection signals S1(1), S1(2), . . . , Sn(1), . . . , Sn(n) are needed, as shown in FIG. 2A. FIG. 4B is a configuration diagram of a level shift register in accordance with another embodiment of the present invention. The numeral reference 42 in FIG. 4B is a register.

Figure 5A:
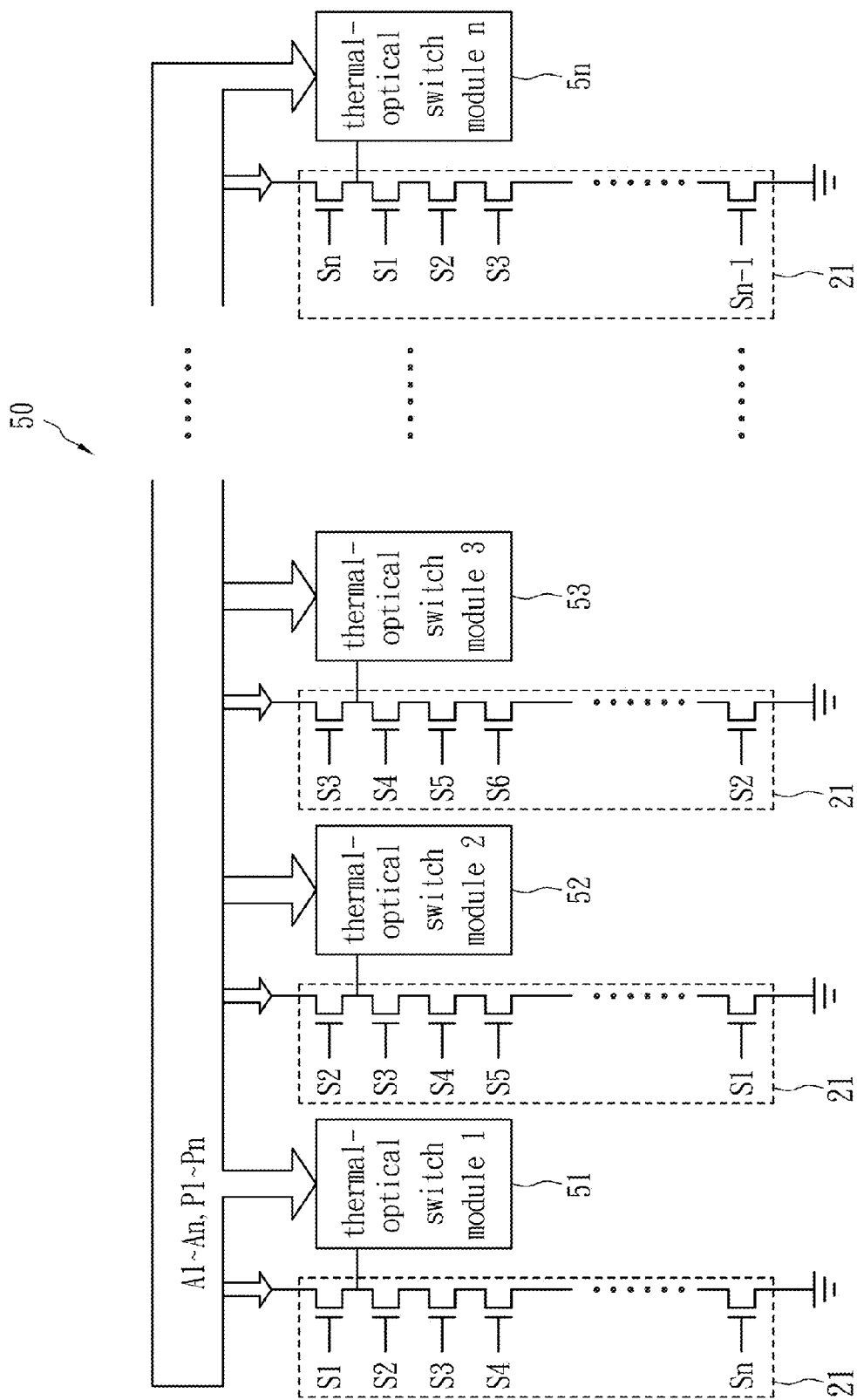
FIG. 5A is a schematic diagram of a multi-dimensional data registration integrated circuit for driving a thermal-optical switch module in accordance with the present invention.
Figure 5B:
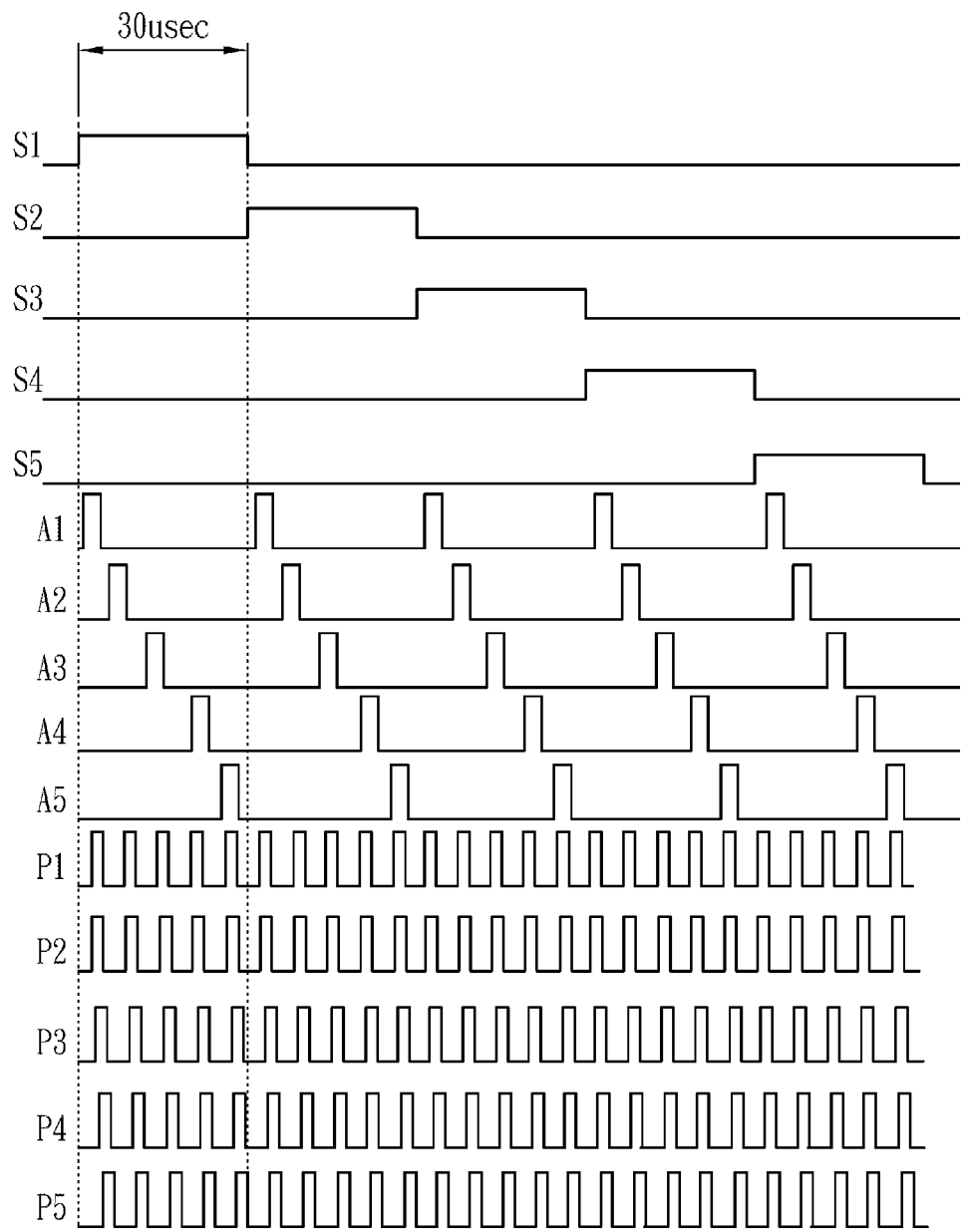
FIG. 5B is a waveform diagram of signals generated by the multi-dimensional data registration integrated circuit in FIG. 5A.

FIG. 5A is a schematic diagram of a multi-dimensional data registration integrated circuit for driving a thermal-optical switch module in accordance with the present invention. A plurality of thermal-optical switch modules 51-5n are respectively selected by the first hierarchy address selection circuit 21 and activated. The light path of each of the thermal-optical switch modules 51-5n is controlled by the second hierarchy address selection signals A1-An and the data signals P1-Pn. FIG. 5B is a waveform diagram of signals generated by the multi-dimensional data registration integrated circuit in FIG. 5A. In this embodiment, there are five thermal-optical switch modules.

Figure 6:
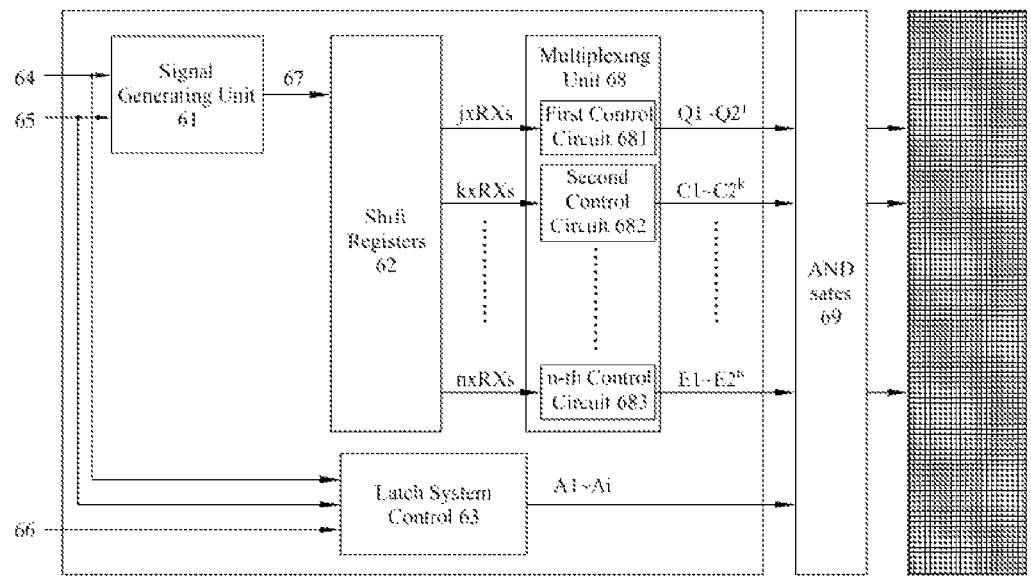
FIG. 6 is a schematic view of a multi-dimensional data registration integrated circuit for driving array-arrangement devices in accordance with another preferred embodiment of the present invention.

FIG. 6 is a schematic view of a multi-dimensional data registration integrated circuit for driving array-arrangement devices in accordance with another preferred embodiment of the present invention. The signal generating unit 61 is electrically connected to the shift registers 62. The signal generating unit 61 receives the first timing signal 64 and an input data 65 to generate an enabling signal 67. One of the shift registers 62 receives the enabling signal 67 and a second timing signal to shift the input data 65 for generating address signals ($Q1 \sim Q2^{hu\ j}$, $C1 \sim C2^k$, . . . , $E1 \sim E2^n$). The array-arrangement devices comprise a plurality of the i-th hierarchy sets, each of the i-th hierarchy sets is further divided into a plurality of the (i+1)-th hierarchy sets, wherein both i and n are positive integers and $0 < i < n$; a i-th hierarchy address selection circuit, comprising a signal generating unit 61 and a multiplexing unit 68, wherein the signal generating unit 61 generates an enabling signal 67 based on a first timing signal 64 and an input data 65, the multiplexing unit 68 is electrically connected to the signal generating unit 61 via a shift register 62 and shifts the input data 65 based on the enabling signal 67 and a second timing signal to further generate n bits of address signals ($Q1 \sim Q2^j$, $C1 \sim C2^k$, . . . , $E1 \sim E2^n$), the shift register 62 generates a set of enabling signals via a first control circuit 681, a second control circuit 682, or a third control circuit 683, a logic operation is performed between the address signal and one of the set of enabling signals to drive a cell circuit, the i-th hierarchy address selection circuit is used to scan the plurality of the i-th hierarchy sets and select at least one of the i-th hierarchy sets to function; and a data supply circuit to follow a scan sequence of the j-th hierarchy address selection circuit and write a plurality of data into the selected j-th hierarchy sets, and $1 \leq j < (n+1)$.

Various control methods of the geometrical signals are available for the shift registers 62. For example, the shift registers 62 generate odd address signals in the first timing period, and then generate even address signals in the second timing period via the first control circuit 681. In the second control circuit 682, the shift registers 62 generate the 3m+1 address signals in the first timing period, generate the 3m+2 address signals in the second timing period, and then 3m+3 address signals in the third timing period, where m is 0 or a positive integer. So on and so forth. For the n-th control circuit 683, the shift registers 62 generate $n^x m+1$ address signals in the first timing period, so on and so forth. For the last timing period, the shift registers 62 generate nxm+n address signals, where m is 0 or a positive integer and n is a positive integer.

A latch control system 63 receives a third timing signal 66 and generates multiple output signals A1~Ai at a time. A logic AND operation is performed between the address signal ($Q1 \sim Q2^j$, $C1 \sim C2^k$, . . . , $E1 \sim E2^n$) and one of the set of multiple output signals A1~Ai to drive a cell circuit. The logic AND operation is performed by one of a set of AND logic gates 69, and the number of the AND gates 69 is equal to the multiplication of the number of the address signals and the number of the enabling signals.

Preferably, the shift registers 62 comprise p shifting sub-circuit, each of the shifting sub-circuit comprises a type-I D flip-flop and a type-II D flip-flop, and p is a positive integer. A trigger end of the type-I D flip-flop receives the second timing signal, the input end of the type-II D flip-flop is electrically connected to the output of the type-I D flip-flop, the trigger end of the type-II D flip-flop receives the enabling signal 67, and the type-II D flip-flop outputs the address signal based on the output of the type-I D flip-flop and the enabling signal 67. The input end of the type-I D flip-flop of the first shifting sub-circuit of the p shifting sub-circuits receives the input data, the input of the type-I D flip-flop of each of the other (p−1) shifting sub-circuit is electrically connected to the input end of the type-I D flip-flop of the next shifting sub-circuit.

Preferably, every shift register is used to receive part of the timing counting signal and combined with an odd-even number selection mechanism or a 1, 4, 7, . . . element mechanism to generate a set of enabling signal. In this manner, the driving control of the present element circuits can be reached via any random combination of the address signal and each set of the enabling signals, i.e., the driving of each element circuit is fulfilled via the control of an address signal and one set of the enabling signals. This arrangement is able to prevent generating erroneously triggering signals in the original signals due to the mutual interference of the ultrasonic circuits.

Figure 7:
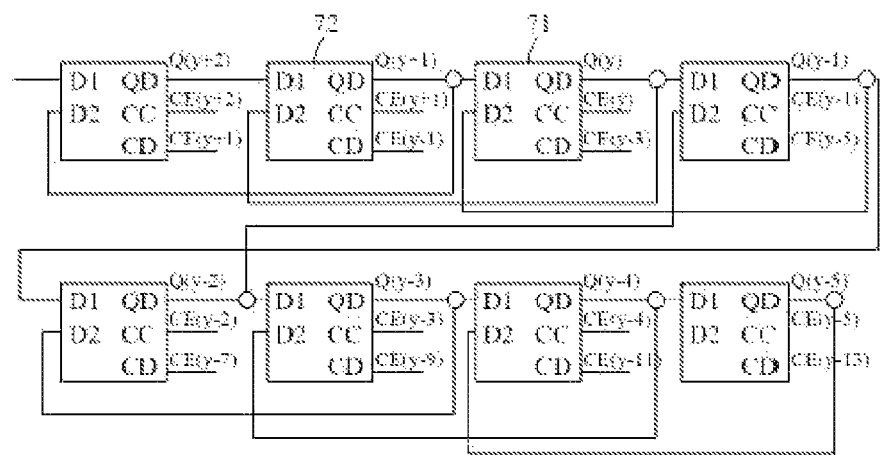
FIG. 7 is a schematic view of a multi-dimensional data registration integrated circuit in accordance with the second preferred embodiment of the present invention.

FIG. 7 is a schematic view of a multi-dimensional data registration integrated circuit in accordance with the second preferred embodiment of the present invention. FIG. 7 is an illustration of the details of the first control circuit 681 in FIG. 6. A shifting sub-circuit uses a first control circuit to generate the enabling signals in a serial-in and parallel-out manner. The first control circuit connects an output of a k-th D flip-flop from the output end to a trigger end of a (k+1)-th D flip-flop. For example, the output Q(y) of the y-th D flip-flop 71 is connected to the trigger end D2 of the (y+1)-th D flip-flop 72, such that the plurality of D flip-flops output the set of enabling signal once for every two timing periods. Therefore, the adjacent enabling signals will not be active simultaneously.

Figure 8:
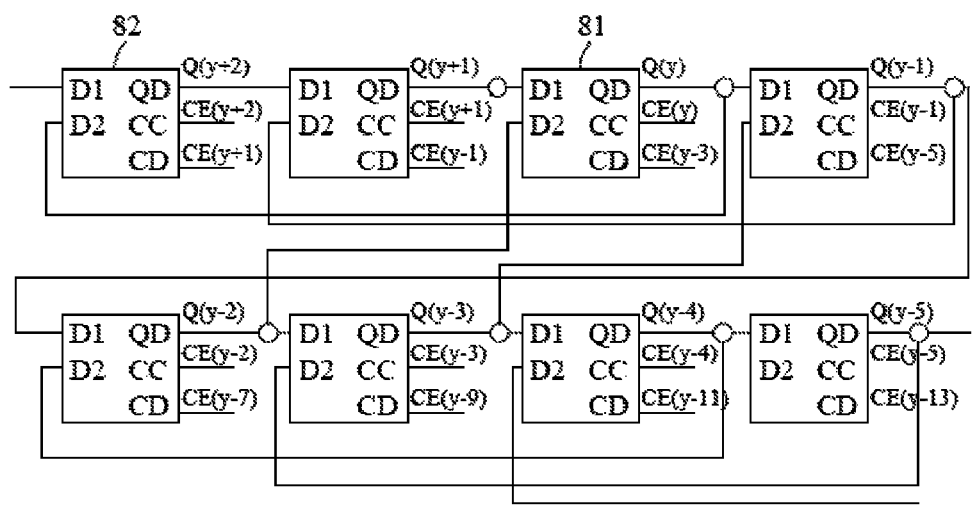
FIG. 8 is a schematic view of a multi-dimensional data registration integrated circuit in accordance with the third preferred embodiment of the present invention.

FIG. 8 is a schematic view of a multi-dimensional data registration integrated circuit in accordance with the third preferred embodiment of the present invention. FIG. 8 is an illustration of the details of the second control circuit 682 in FIG. 6. A shifting sub-circuit uses a second control circuit to generate the enabling signals in a serial-in and parallel-out manner. The second control circuit connects an output of a k-th D flip-flop from the output end to a trigger end of a (k+2)-th D flip-flop. For example, the output Q(y) of the y-th D flip-flop 81 is connected to the trigger end D2 of the (y+2)-th D flip-flop 82, such that the plurality of D flip-flops output the set of enabling signal once for every three timing periods. Therefore, the adjacent enabling signals will not be active simultaneously. For the same reason, the third control circuit of the shifting circuit connects an output of the k-th D flip-flop from the output end to a trigger end of a (k+3)-th D flip-flop. The process of the third control circuit is similar with the one in the first control circuit and the one in the second control circuit, so the repetitious details need not be given here.

Figure 9A:
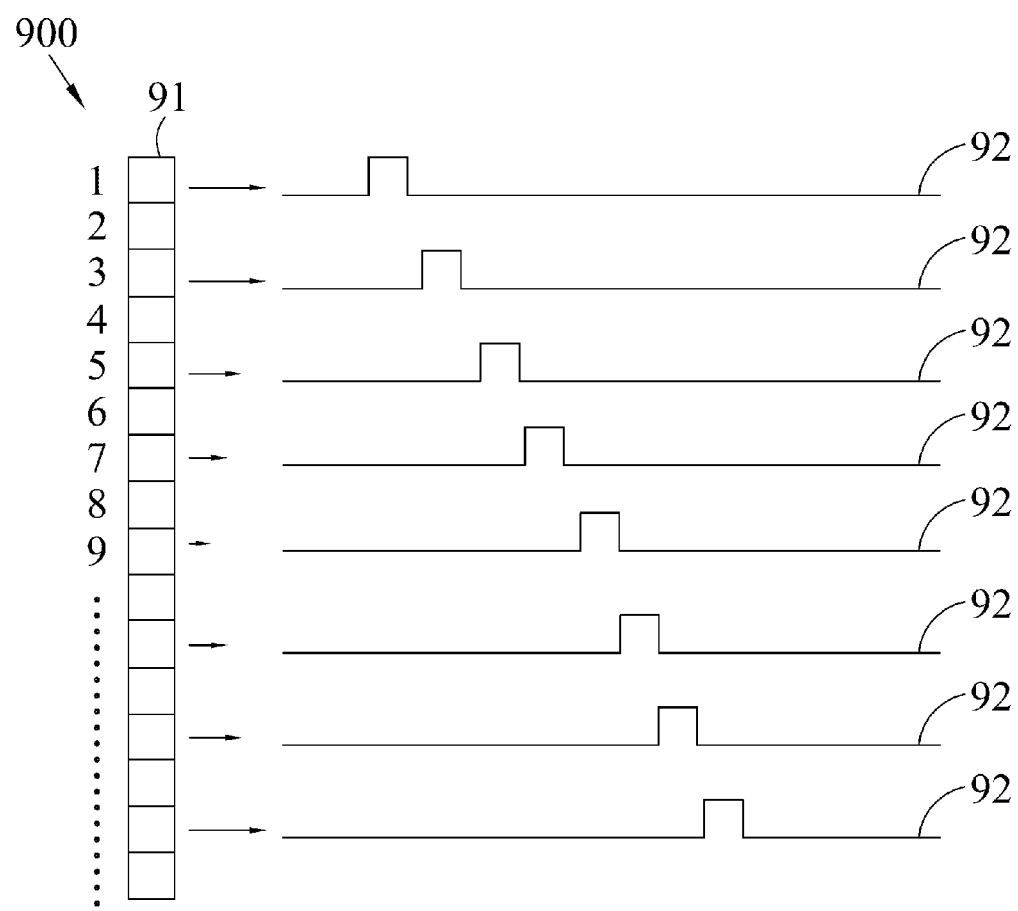
FIG. 9A is the first cycle time schematic waveform view of a multi-dimensional data registration integrated circuit in accordance with the fourth preferred embodiment of the present invention.
Figure 9B:
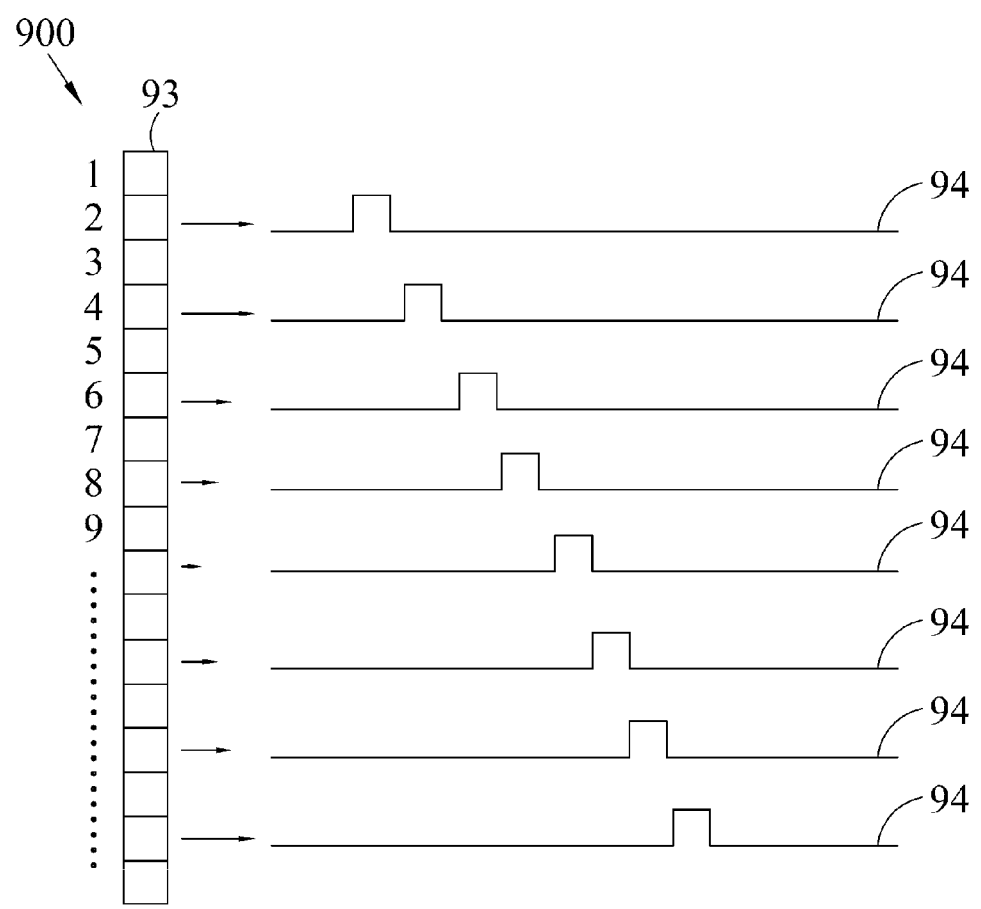
FIG. 9B is the second cycle time schematic waveform view of a multi-dimensional data registration integrated circuit in accordance with the fourth preferred embodiment of the present invention.

FIG. 9A is the first cycle time schematic waveform view of a multi-dimensional data registration integrated circuit in accordance with the fourth preferred embodiment of the present invention. Under the one dimension circuit configuration 900, when the first control circuit is employed, the odd channels 92 are turned on only at the first time period 91 and the even channels 94 are turned off at the first time period. On the other hand, as shown in FIG. 9B, when the first control circuit is employed, the even channels 94 are turned on only at the second time period 93 and the odd channels 92 are turned off at the second time period. With the first control circuit, the interference between adjacent channels is reduced.

Figure 10A:
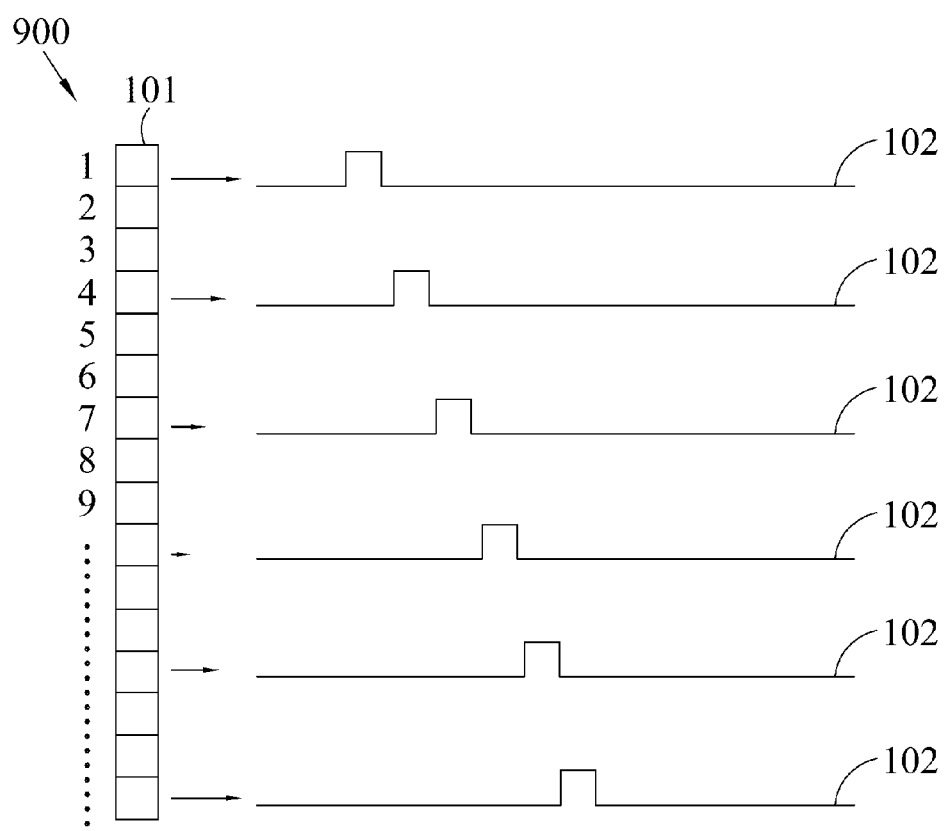
FIG. 10A is the first cycle time schematic waveform view of a multi-dimensional data registration integrated circuit in accordance with the fifth preferred embodiment of the present invention.
Figure 10B:
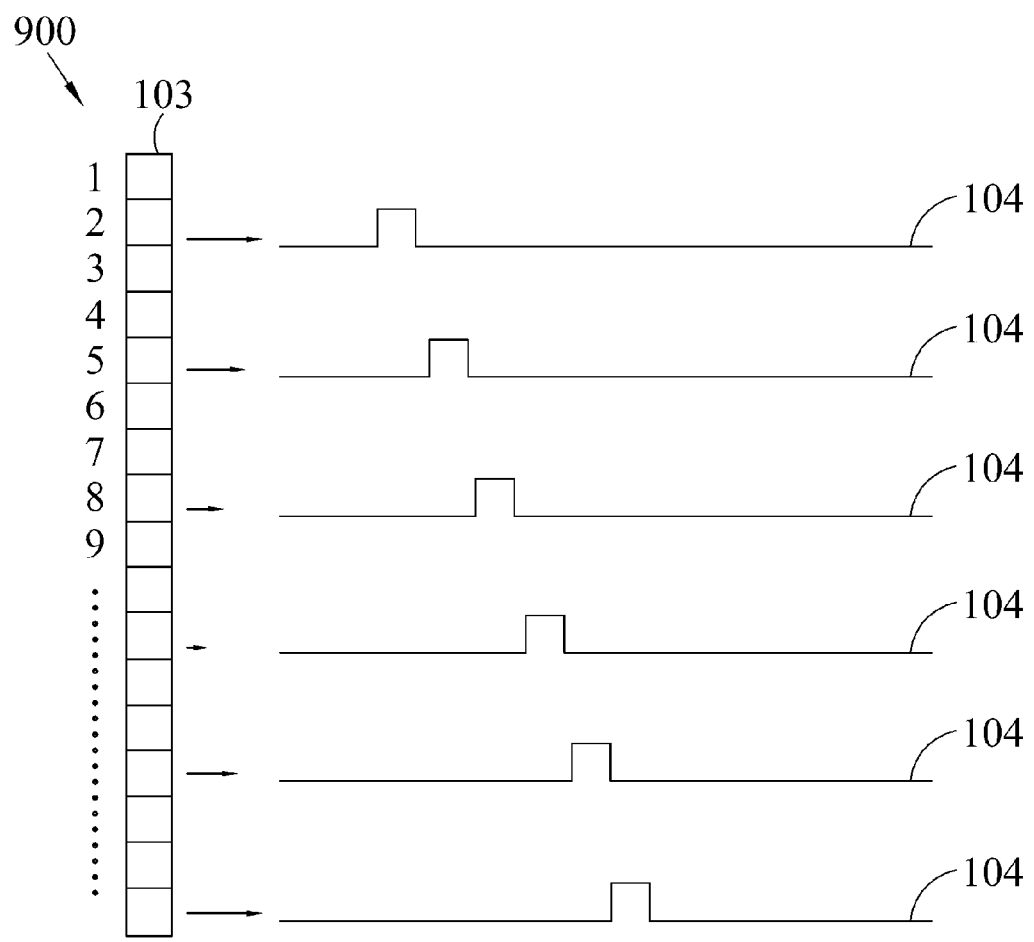
FIG. 10B is the second cycle time schematic waveform view of a multi-dimensional data registration integrated circuit in accordance with the fifth preferred embodiment of the present invention.
Figure 10C:
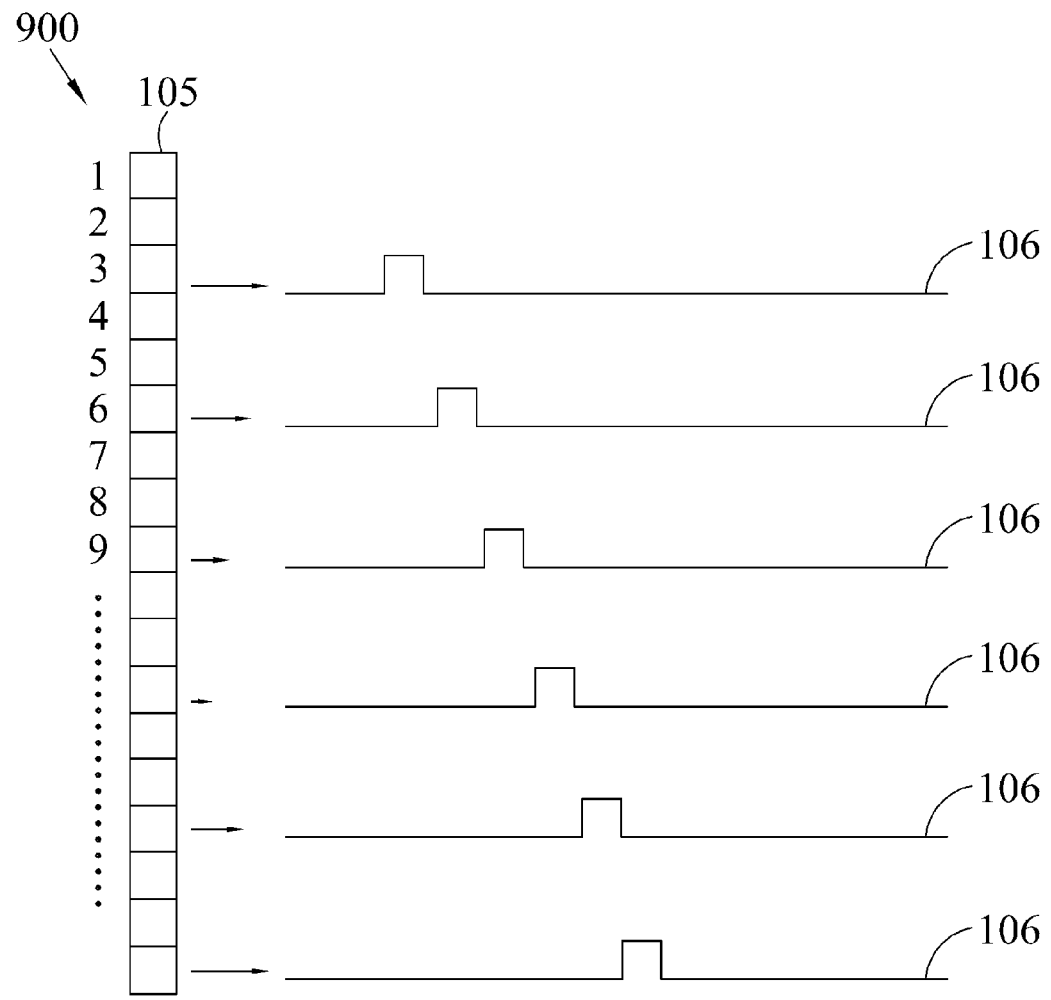
FIG. 10C is the third cycle time schematic waveform view of a multi-dimensional data registration integrated circuit in accordance with the fifth preferred embodiment of the present invention.

FIG. 10A, FIG. 10B, and FIG. 10C are the first cycle time schematic waveform view, the second cycle time schematic waveform view, and the third cycle time schematic waveform view of a multi-dimensional data registration integrated circuit in accordance with the fifth preferred embodiment of the present invention. Under the one dimension circuit configuration 900, as shown in FIG. 10A, when the second control circuit is employed, the (3*i+1) channels 102 are turned on only at the first time period 101 and the rest channels are turned off at the first time period 101. In FIG. 10B, the (3*i+2) channels 104 are turned on only at the second time period 103 and the rest channels are turned off at the second time period 103. In FIG. 10C, the (3*i+3) channels 106 are turned on only at the third time period and the rest channels are turned off at the third time period, where i is an integer and i>=0. With the second control me circuit, the interference between adjacent channels is also reduced.

Figure 11A:
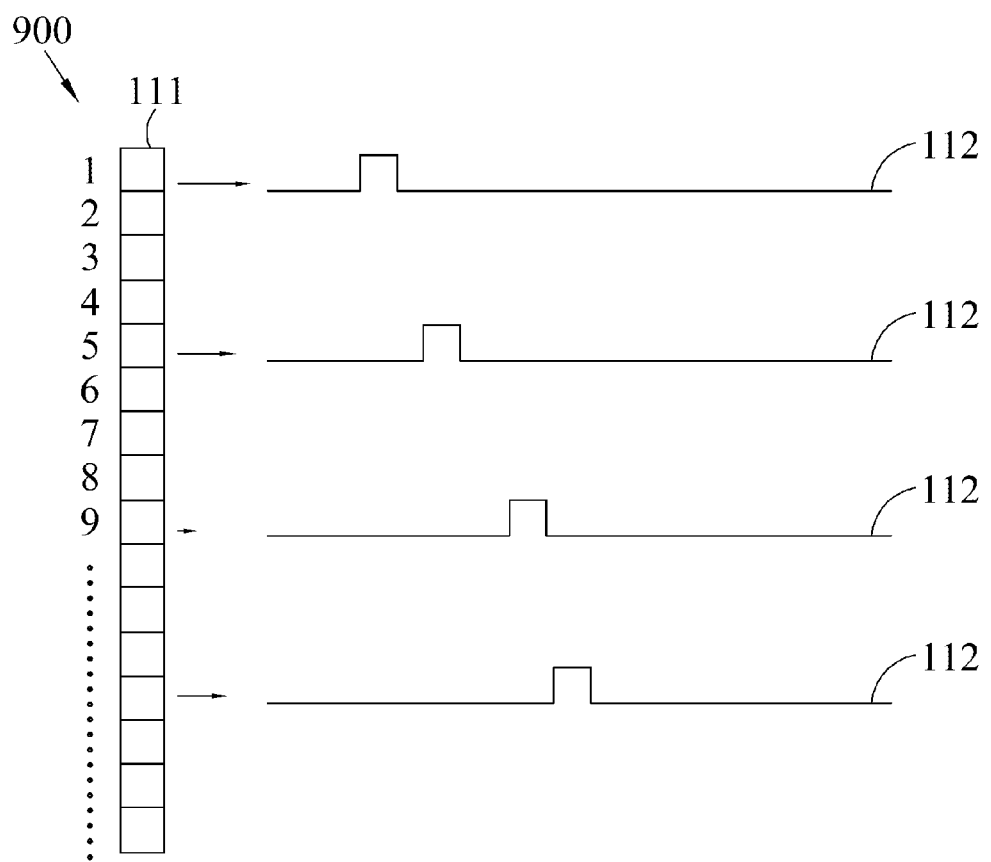
FIG. 11A is the first cycle time schematic waveform view of a multi-dimensional data registration integrated circuit in accordance with the sixth preferred embodiment of the present invention.
Figure 11B:
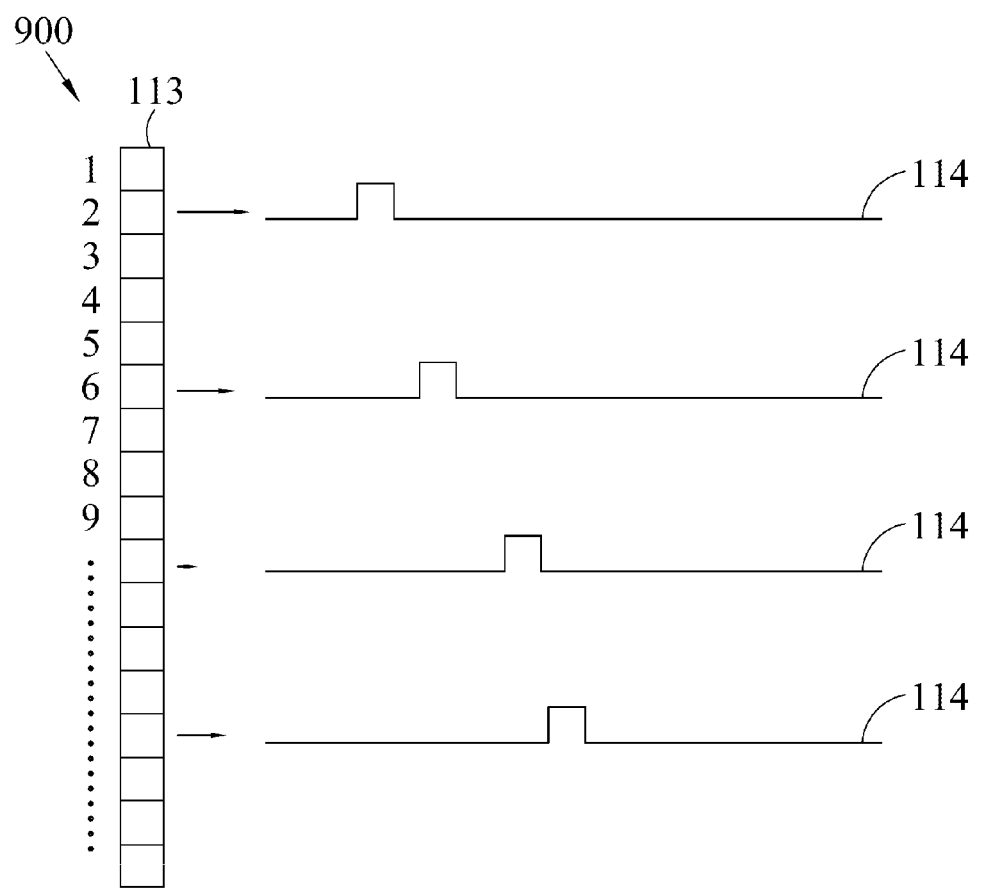
FIG. 11B is the second cycle time schematic waveform view of a multi-dimensional data registration integrated circuit in accordance with the sixth preferred embodiment of the present invention.
Figure 11C:
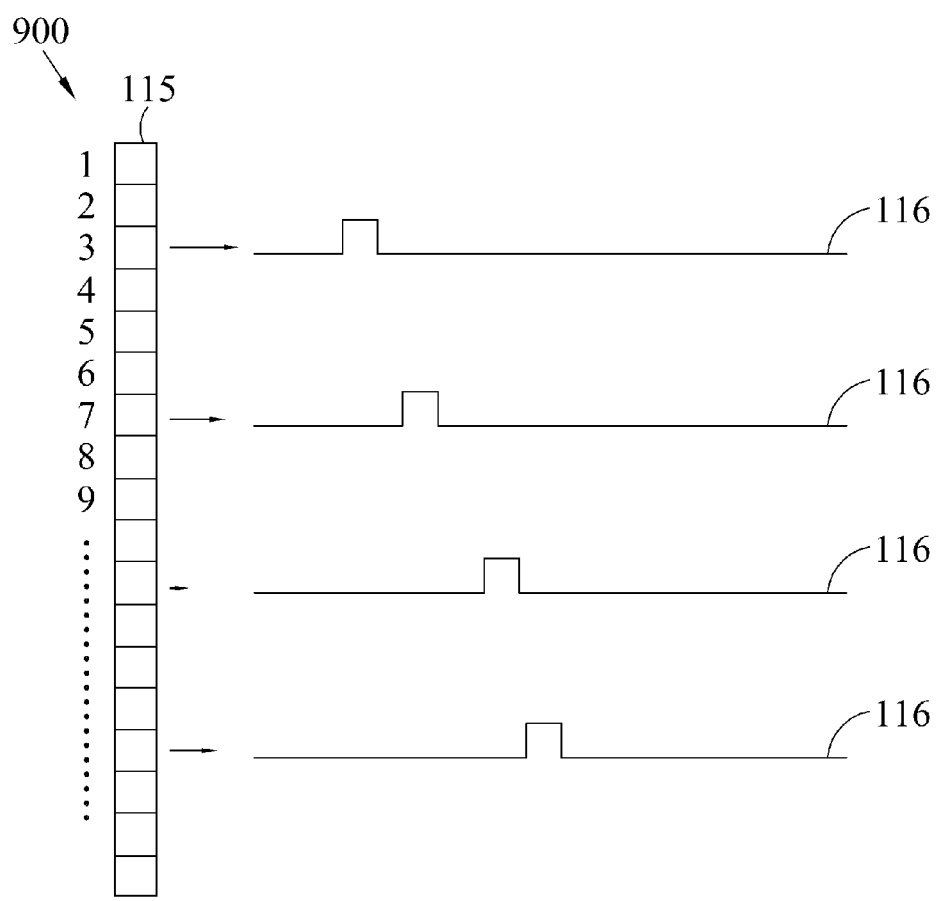
FIG. 11C is the third cycle time schematic waveform view of a multi-dimensional data registration integrated circuit in accordance with the sixth preferred embodiment of the present invention.
Figure 11D:
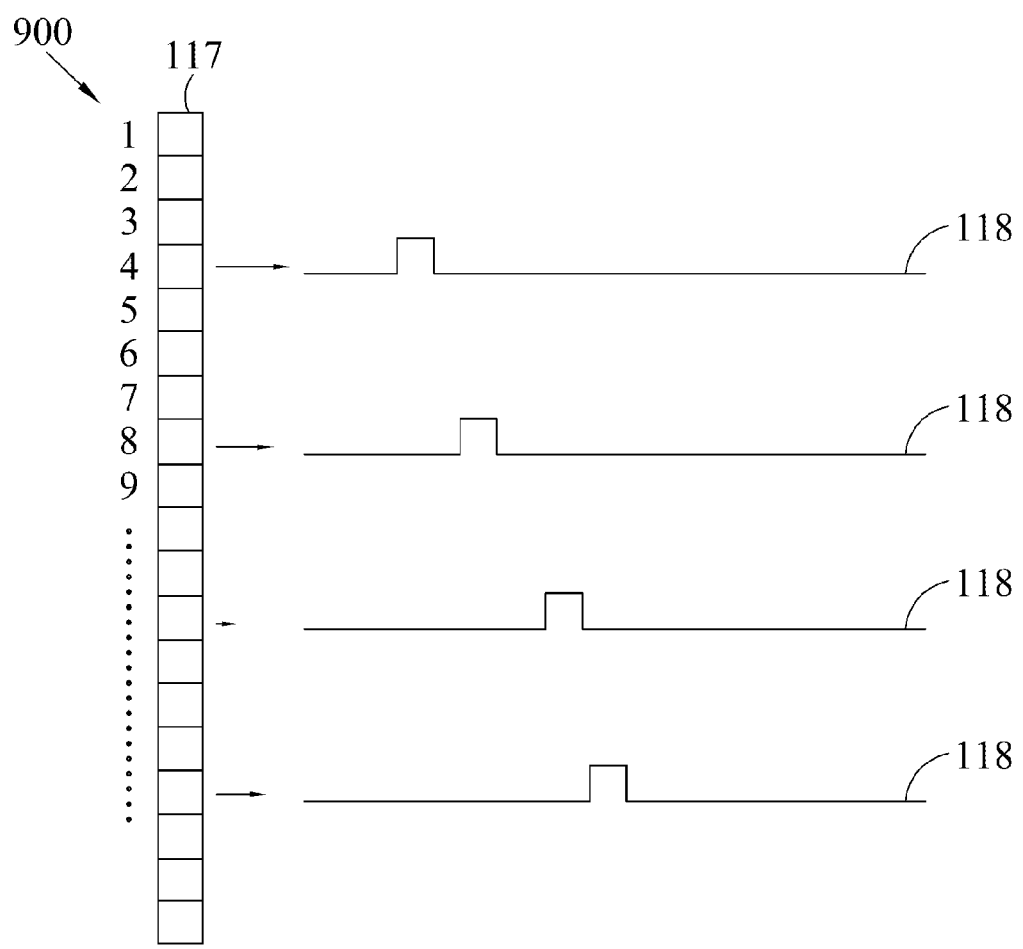
FIG. 11D is the fourth cycle time schematic waveform view of a multi-dimensional data registration integrated circuit in accordance with the sixth preferred embodiment of the present invention.

FIG. 11A, FIG. 11B, FIG. 11C, and FIG. 11D are the first cycle time schematic waveform view, the second cycle time schematic waveform view, the third cycle time schematic waveform view, and the fourth cycle time schematic waveform view of a multi-dimensional data registration integrated circuit in accordance with the sixth preferred embodiment of the present invention. Under the one dimension circuit configuration 900, as shown in FIG. 11A, when the third control circuit is employed, the (4*i+1) channels 112 are turned on only at the first time period 111 and the rest channels are turned off at the first time period 111, where i is an integer and i>=0. In FIG. 11B, the (4*i+2) channels 114 are turned on only at the second time period 113 and the rest channels are turned off at the second time period. In FIG. 11C, the (4*i+3) channels 116 are turned on only at the third time period 115 and the rest channels are turned off at the third time period 115. In FIG. 11D, the (4*i+4) channels 118 are turned on only at the fourth time period 117 and the rest channels are turned off at the fourth time period 117. With the third control circuit, the interference between adjacent channels is reduced.

Figure 12:
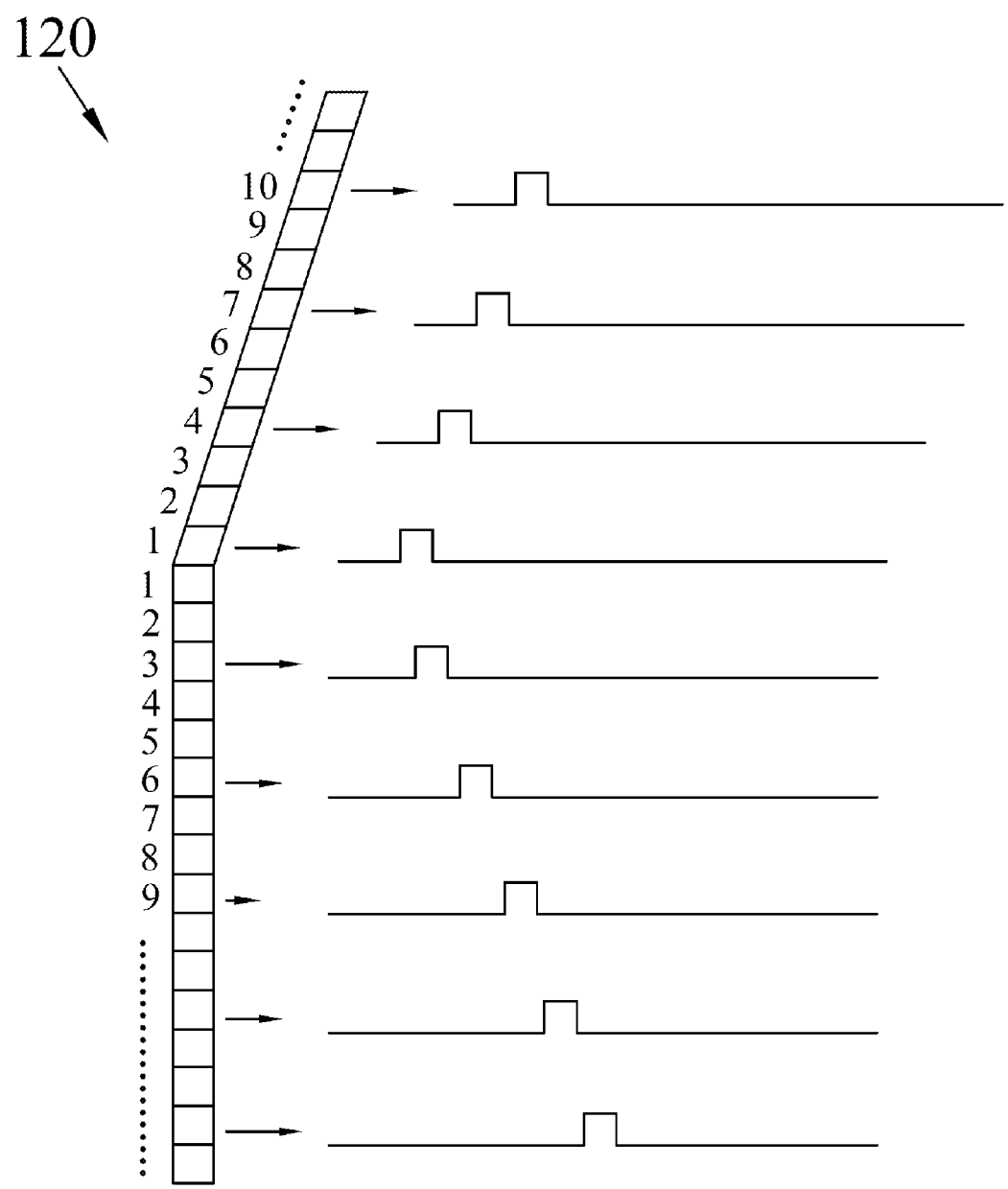
FIG. 12 is the cycle time schematic waveform view of a multi-dimensional data registration integrated circuit in accordance with the seventh preferred embodiment of the present invention.

FIG. 12 is the cycle time schematic waveform view of a multi-dimensional data registration integrated circuit in accordance with the seventh preferred embodiment of the present invention. Under the two dimension circuit configuration 120, one of the first control circuit, the second control circuit, and the third control circuit is also used for reducing the interference between adjacent channels. The process of reducing the interference is similar the one as above, so the repetitious details need not be given here.

Figure 13:
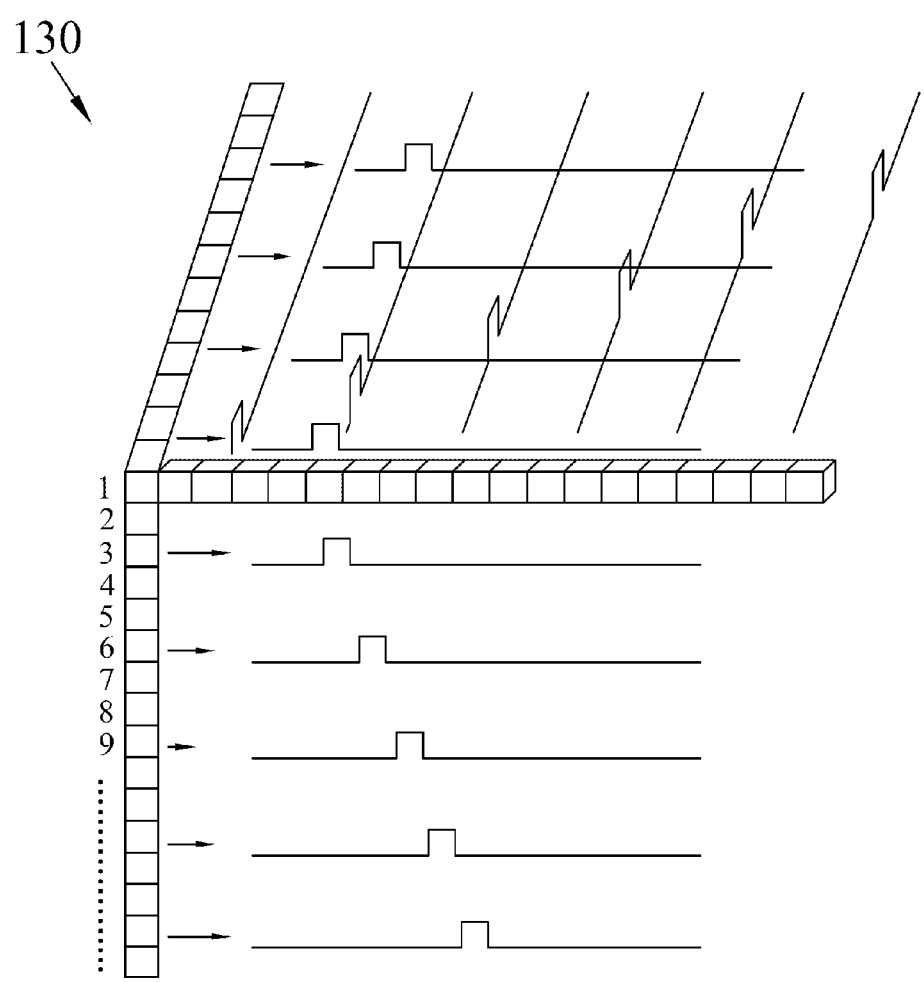
FIG. 13 is the cycle time schematic waveform view of a multi-dimensional data registration integrated circuit in accordance with the eighth preferred embodiment of the present invention.

FIG. 13 is the cycle time schematic waveform view of a multi-dimensional data registration integrated circuit in accordance with the eighth preferred embodiment of the present invention. Under the three dimension circuit configuration 130, one of the first control circuit, the second control circuit, and the third control circuit is also used for reducing the interference between adjacent channels. The process of reducing the interference is similar the one as above, so the repetitious details need not be given here.

While the invention has been described by means of specific embodiments, numerous modifications and variations could be made thereto by those skilled in the art without departing from the scope and spirit of the invention set forth in the claims.

What is claimed is:

1. A multi-dimensional data registration integrated circuit for driving array-arrangement devices, comprising:
   a plurality of the i-th hierarchy sets, each of the i-th hierarchy sets is further divided into a plurality of the (i+1)-th hierarchy sets, wherein both i and n are positive integers and 0<i<n;
   a i-th hierarchy address selection circuit, comprising a signal generating unit and a multiplexing unit, wherein the signal generating unit generates an enabling signal based on a first timing signal and an input data, the multiplexing unit is electrically connected to the signal generating unit via a shift register and shifts the input data based on the enabling signal and a second timing signal to further generate n bits of address signals, the shift register generate a set of enabling signals via a first control circuit, a second control circuit, or a third control circuit, wherein the first, second, and third control circuits enable the signals once for every two, there, and four timing periods, respectively, a logic operation is performed between the address signal and one of the set of enabling signals to drive a cell circuit, the i-th hierarchy address selection circuit is used to scan the plurality of the i-th hierarchy sets and select at least one of the i-th hierarchy sets to function; and a data supply circuit to follow a scan sequence of the j-th hierarchy address selection circuit and write a plurality of data into the selected j-th hierarchy sets, and $1<j<(n+1)$.

2. The multi-dimensional data registration integrated circuit for driving array-arrangement devices of claim 1, wherein the i-th hierarchy address selection circuit further comprises a level shift register circuit, the level shift register circuit is used to output a plurality of the i-th hierarchy address selection signals, and the plurality of the i-th hierarchy address selection signals are used to select the plurality of the i-th hierarchy sets.

3. The multi-dimensional data registration integrated circuit for driving array-arrangement devices of claim 1, wherein the array-arrangement devices comprises a plurality of thermal resistors, and the plurality of thermal resistors are used to control a plurality of nozzles of a printhead chip.

4. The multi-dimensional data registration integrated circuit for driving array-arrangement devices of claim 1, wherein the i-th hierarchy address selection circuit comprises asymmetric MOSFET devices or CMOSFET devices.

5. The multi-dimensional data registration integrated circuit for driving array-arrangement devices of claim 1, wherein the shift register comprises n D flip-flops in series and generates the set of enabling signal via the first control circuit, the second control circuit, or the third control circuit.

6. The multi-dimensional data registration integrated circuit for driving array-arrangement devices of claim 5, wherein the first control circuit is to connect an output of a k-th D flip-flop from the output end to a trigger end of a (k+1)-th D flip-flop, such that the n D flip-flops output the set of enabling signal once for every two timing periods, and $0<k<n$.

7. The multi-dimensional data registration integrated circuit for driving array-arrangement devices of claim 5, wherein the first control circuit is to connect an output of a k-th D flip-flop from the output end to a trigger end of a (k+2)-th D flip-flop, such that the n D flip-flops output the set of enabling signal once for every three timing periods, and $1<k<n$.

8. The multi-dimensional data registration integrated circuit for driving array-arrangement devices of claim 5, wherein the first control circuit is to connect an output of a k-th D flip-flop from the output end to a trigger end of a (k+3)-th D flip-flop, such that the n D flip-flops output the set of enabling signal once for every four timing periods, and $2<k<n$.

9. The multi-dimensional data registration integrated circuit for driving array-arrangement devices of claim 1, wherein the shift register is electrically connected to the signal generating unit.

10. The multi-dimensional data registration integrated circuit for driving array-arrangement devices of claim 1, wherein the i-th address selection circuit further comprises a latch control unit, and the latch control unit generates and maintains a plurality of output signal based on a third timing signal.

11. The multi-dimensional data registration integrated circuit for driving array-arrangement devices of claim 1, wherein the logic operation further comprises the step of using each one of a set of AND logic gates to perform an AND operation.

12. The multi-dimensional data registration integrated circuit for driving array-arrangement devices of claim 1, wherein the number of the AND gates is equal to the multiplication of the number of the address signals and the number of the enabling signals.

13. The multi-dimensional data registration integrated circuit for driving array -arrangement devices of claim 1, wherein the shift register comprises p shifting sub-circuit, each of the shifting sub-circuit comprises a type-I D flip-flop and a type-II D flip-flop, and p is a positive integer.

14. The multi-dimensional data registration integrated circuit for driving array-arrangement devices of claim 1, wherein a trigger end of the type-I D flip-flop receives the second timing signal, the input end of the type-II D flip-flop is electrically connected to the output of the type-I D flip-flop, the trigger end of the type-II D flip-flop receives the enabling signal, and the type-II D flip-flop outputs the address signal based on the output of the type-I D flip-flop and the enabling signal.

15. The multi-dimensional data registration integrated circuit for driving array-arrangement devices of claim 14, wherein the input end of the type-I D flip-flop of the first shifting sub-circuit of the p shifting sub-circuits receives the input data, the input of the type-I D flip-flop of each of the other (p−1) shifting sub-circuit is electrically connected to the input end of the type-I D flip-flop of the next shifting sub-circuit.

* * * * *